(12) United States Patent
Chausse et al.

(10) Patent No.: US 6,386,789 B1
(45) Date of Patent: May 14, 2002

(54) QUICK RELEASE BALL TYPE LOCKING PIN AND PRODUCTION TOOL

(76) Inventors: Paul D. Chausse, 7420 Meadow View Rd., Manhattan, MT (US) 59741; V. Leroy Chausse, 1422 28$^{th}$ Ave., Lewiston, ID (US) 83501

( * ) Notice: Subject to any disclaimer, the term of this patent is extended or adjusted under 35 U.S.C. 154(b) by 0 days.

(21) Appl. No.: 09/405,354

(22) Filed: Sep. 24, 1999

(51) Int. Cl.$^7$ .................................................. F16B 21/00
(52) U.S. Cl. ..................... 403/322.2; 403/328; 411/348
(58) Field of Search ........................... 403/322.2, 322.3, 403/325, 321, 322.1, 328; 411/348

(56) References Cited

U.S. PATENT DOCUMENTS

| | | | |
|---|---|---|---|
| 2,515,807 A | * 7/1950 | Spooner | 411/348 |
| 3,043,614 A | * 7/1962 | Eichmann | 403/321 |
| 3,046,827 A | * 7/1962 | Myers | 411/348 |
| 3,070,393 A | 12/1962 | Silverberg et al. | 287/130 |
| 3,170,362 A | * 2/1965 | Mewse | 411/348 |
| 3,507,528 A | * 4/1970 | Desmarchais | 403/325 X |
| 3,551,013 A | 12/1970 | Trojanowski et al. | 287/119 |
| 3,596,554 A | * 8/1971 | Low | 411/348 |
| 3,611,748 A | 10/1971 | Wallgren | 64/4 |
| 4,157,019 A | 5/1979 | von Allworden | 64/4 |
| 4,169,686 A | 10/1979 | Balensiefen et al. | 403/12 |
| 4,792,255 A | * 12/1988 | McArthur et al. | 403/325 |
| 4,941,862 A | 7/1990 | Hazebrook et al. | 464/141 |
| 4,986,059 A | * 1/1991 | Boutilier | 403/328 X |
| 4,988,248 A | * 1/1991 | Flux | 403/328 X |
| 5,184,979 A | 2/1993 | Hazebrook et al. | 464/141 |
| 5,394,594 A | * 3/1995 | Duran | 403/321 X |
| 5,458,431 A | * 10/1995 | Ferreol-Ragotin | 403/325 X |
| 5,658,087 A | * 8/1997 | Butkovich et al. | 403/328 X |
| 6,062,112 A | * 5/2000 | Bonniot | 403/328 X |

* cited by examiner

*Primary Examiner*—Lynne H. Browne
*Assistant Examiner*—David E. Bochna
(74) *Attorney, Agent, or Firm*—Wells St. John P.S.

(57) ABSTRACT

A quick release ball type locking pin is described in which a tubular body is formed along an axis. The tubular body includes an internal bore defined by an internal tubular wall surface, and an external tubular body surface. A locking ball having an outside ball diameter is received within a locking ball retainer socket formed in the tubular body. The retainer socket includes an external opening along the external body surface and an internal socket wall leading into the internal bore. The internal socket wall includes a ball retainer flange formed by a first outer socket wall section and further includes a cross-sectional dimension less than the outside ball diameter. The internal socket wall leads inward with respect to the axis from the external opening to a first edge spaced inward of the external opening. The internal socket wall also includes a flared section leading from the edge to a second edge. A ball receiving section leads inward to the internal bore from the second edge. The ball is movably received in the locking ball retainer socket for movement therein between an outward operative position wherein part of the ball abuts the ball retainer flange and extends radially beyond the external tubular body surface, and a release position radially inward of the operative position. An actuator is positioned within the internal bore and is configured to selectively allow movement of the ball to the release position, and to lock the ball against movement from the operative position.

29 Claims, 9 Drawing Sheets

QUICK RELEASE BALL TYPE LOCKING PIN AND PRODUCTION TOOL

TECHNICAL FIELD

The present invention relates to releasable locking or latching devices and more particularly to ball type locking devices.

BACKGROUND OF THE INVENTION

Ball type locking pins are used in many different applications where two elements are to be releasably secured together. In a typical ball type locking pin, locking balls are held within the pin and move radially with respect to the pin axis between outwardly projecting operative or locking positions, and inward inoperative or unlocking positions.

Figure 4:
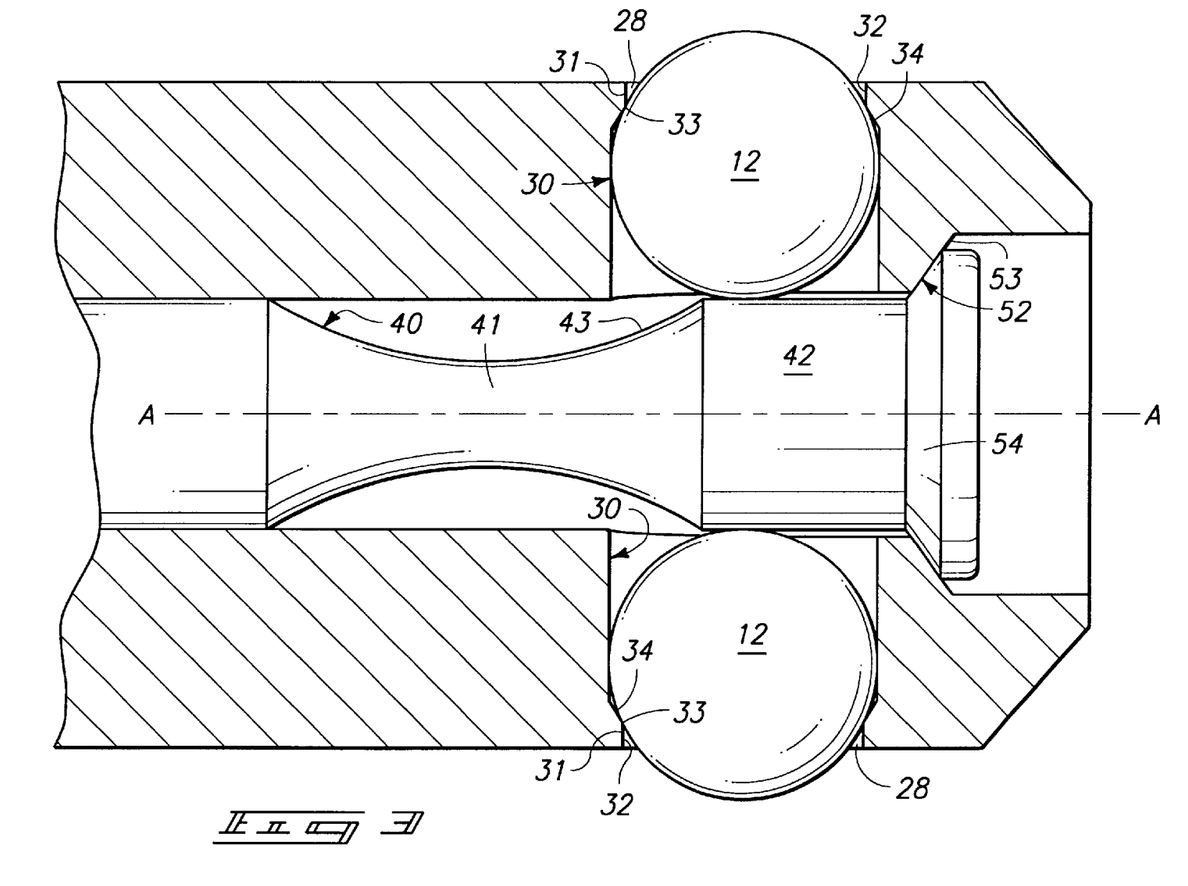
FIG. 4 is an enlarged detail view of a prior art quick release ball type locking pin.
Figure 5:
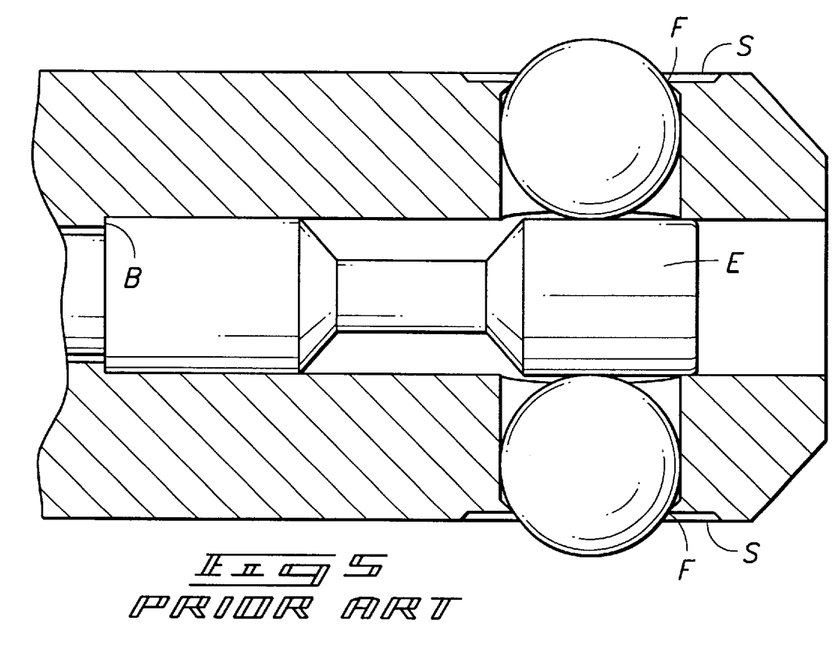
FIG. 5 is an enlarged detail view of another prior art quick release ball type locking pin.

FIGS. 4 and 5 of the drawings illustrate two typical ball locking pins, with particular emphasis on the structure used to retain the locking balls and mechanisms for holding the balls in locking positions.

In FIG. 4, a headed, axially slidable actuator shaft is used, with an enlarged head H at the actuator end that is used to engage and hold the balls in outward projecting locking positions. The headed end of the actuator shaft makes single point type contact with each ball, and with extended use the point contacts wear and deform the head. The result is the deformed head will become progressively more difficult to move axially within the pin and the lock will become faulty.

In the FIG. 5 prior art ball locking pin, the problem stated above is partially eliminated by shifting the actuator shaft stop contact to a location labeled B, where a shoulder machined into the tubular pin body engages a complementary shoulder formed in the axially movable actuator shaft. A cylindrical surface E is used on the actuator shaft in this arrangement to hold the balls in their outward operative positions. The problem with this configuration is that the actuator shaft must be produced in two or three interfitting sections to fit into the body. This increases production costs. Further the surface E must be slightly less than the bore diameter within the pin body in order to facilitate axial movement of the actuator. The actuator may thus flex and wear to a point where one or both of the balls can easily shift radially to an inoperative position and cause lock failure. The diameter of the surface E also forces use of either a larger diameter tubular body, to carry the desired ball diameter, or a reduced ball size. Either situation is often undesirable.

In both prior art configurations (FIGS. 4 and 5), the balls are retained within a pin body by rims F that are formed by stamping or "coining" the external surfaces of the pin body around the ball receiving bores. "Coining" results in depressions S formed in the external surface of the pin body, and imprecise, weak rims F that must accomplish the task of holding the balls against escape. The coined rims F will break with extended use. Once the rims F break, nothing remains to hold the balls within the pin body. The balls will drop out and the lock becomes unusable.

Still other forms of ball locking arrangements make use of separate rims or rings that are threaded or otherwise fitted to hold the locking balls in place. This eliminates the problem presented by the coined surfaces but significantly increases production expense.

The present invention thus has for an objective, to provide a ball type locking pin that is simple in construction yet that will function well with extended use.

A further objective is to provide a ball type locking pin that can be constructed from rolled stainless or other appropriate tube materials without requiring longitudinal boring of the pin body for reception of an actuator.

A still further objective is to provide a ball type locking pin that includes an integral locking ball retainer that will withstand extended use.

A yet further objective is to provide a ball type locking pin that may be easily produced in various lengths.

These and still further objectives and advantages may become apparent from the following description, drawings, and appended claims which define preferred embodiments of our invention.

BRIEF DESCRIPTION OF THE DRAWINGS

Preferred embodiments of the invention are described below with reference to the following accompanying drawings.

FIG. 3 is an enlarged detail view of a forward end of the first preferred form showing the balls in the locking positions;

FIG. 18 is an enlarged detail sectional view showing a formed ball locking pin socket;

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 20:
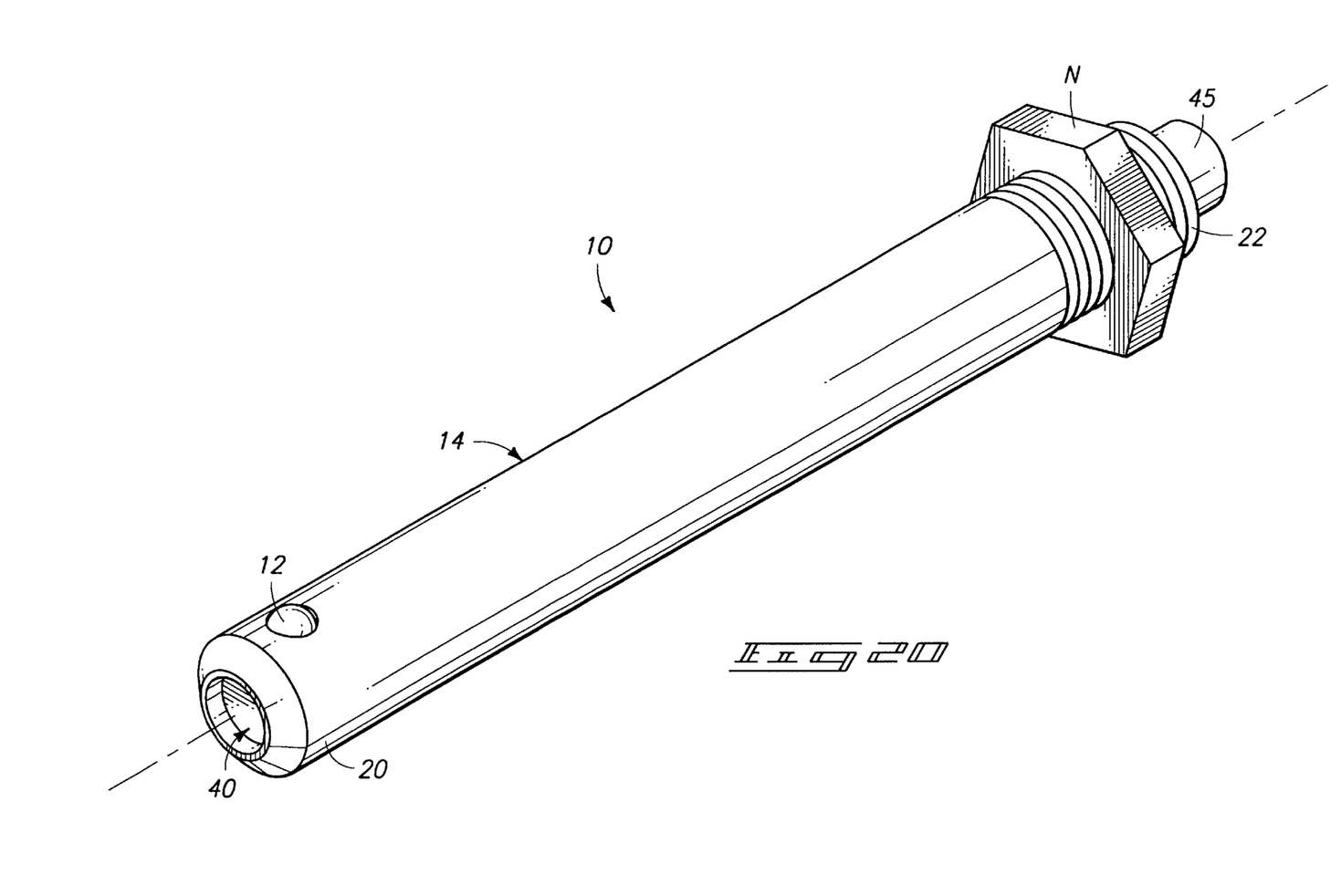
FIG. 20 is a perspective view of an assembled ball type locking pin.

The drawings (with the exception of FIGS. 4 and 5 which show prior art locking pins) exemplify preferred forms of the present ball type locking pin which are generally identified by the reference numeral 10. The present ball type locking pins may be used in many different applications where two or more elements (not shown) are to be releasably fastened together between at least one retractable ball 12 (two being exemplified in the drawings), and another surface such as the nut N shown in FIG. 20.

It is pointed out that the present locking pin 10 may be produced in many size variations and shapes. Further the nut N illustrated is exemplary only of one type of abutment that can be used.

Figure 1:
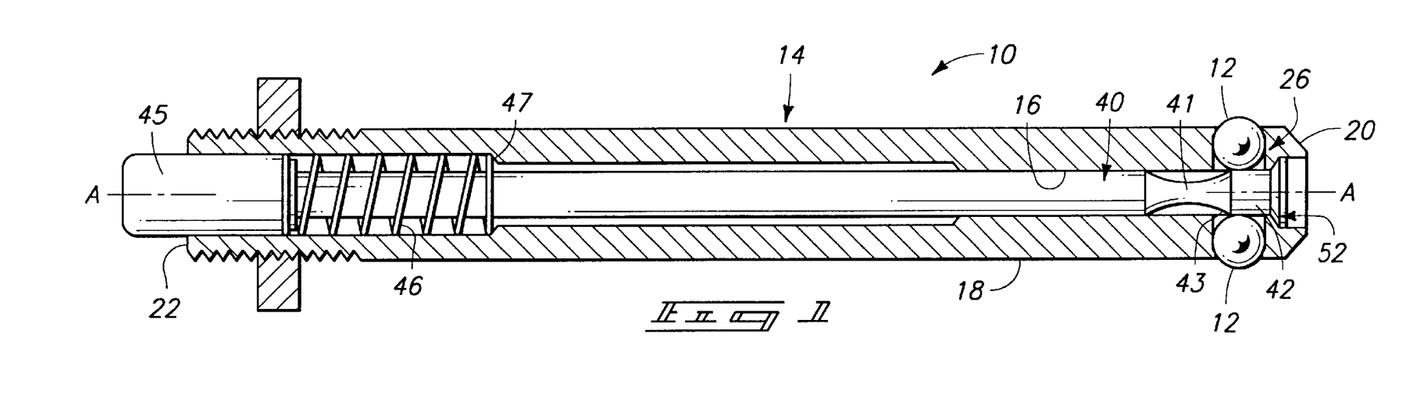
FIG. 1 is a cross-sectional view of a first preferred form of the present quick release ball type locking pin with the balls in outward projecting locking positions.
Figure 2:
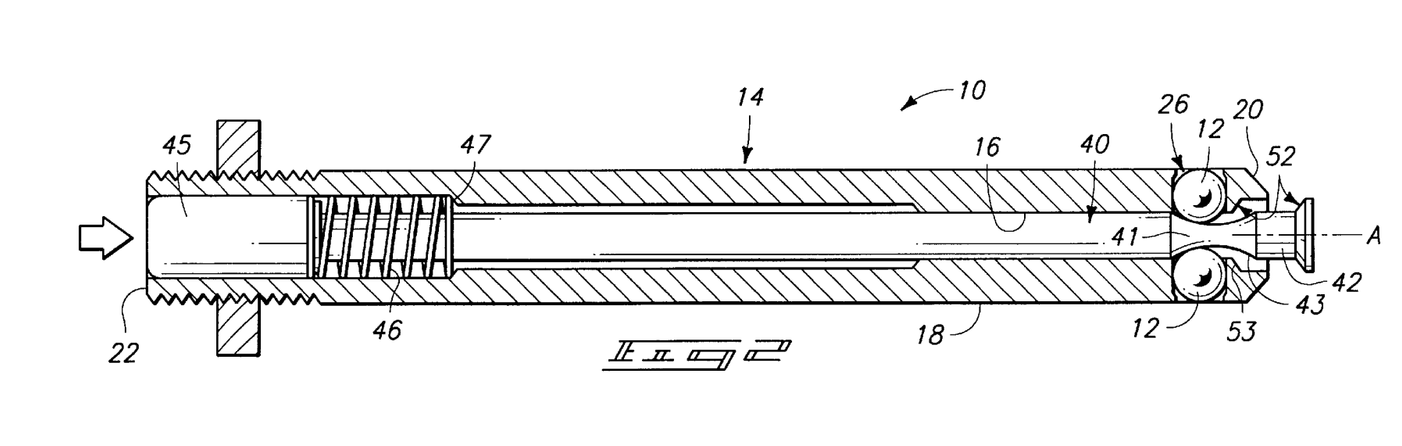
FIG. 2 is a view similar to FIG. 1 only showing the balls in inward unlocking or inoperative positions.

In the first embodiment illustrated in FIGS. 1–3, a tubular body 14 is provided, including an internal bore 16 and an external body surface 18 that are formed along an axis A. The tubular body 14 may extend to various lengths between a forward end 20 and a rearward end 22.

The tubular body 14 of the first embodiment may be produced from various materials depending upon required use. Exemplary materials include but are not limited to aluminum, bronze, plastics, and various grades of steel.

The tubular body 14 includes the internal bore 16 which is defined by an internal tubular wall surface that extends between and opens at the forward and rearward ends 20, 22.

At least one and preferably two locking ball retainer sockets 26 are formed in the tubular body at the forward end, the socket being substantially normal to the axis A. Each of the sockets 26 receives a ball 12 that is moveable therein between an outward operative position (FIGS. 1, 3) wherein part of the ball extends radially beyond the external tubular body surface 18, and a release position (FIG. 2) that is radially inward of the operative position.

An actuator 40 is provided within the internal bore 16 and is axially movable therein. A preferred form of the actuator includes a reduced section 41 that is positionable in substantial radial alignment (with respect to the axis A) with the balls 12 to allow movement of the balls to the release position (see FIG. 2). The actuator 40 also includes a lock section 42 that is also positionable in substantial radial alignment with the balls 12 to lock the balls against movement from the operative position toward the release position (see FIG. 1).

In one preferred form, a stop 52 is axially spaced toward the forward end of the tubular body 14 from the ball retainer sockets 26, and is configured to limit axial movement of the actuator 40 with the lock section in radial alignment with the balls 12.

Figure 19:
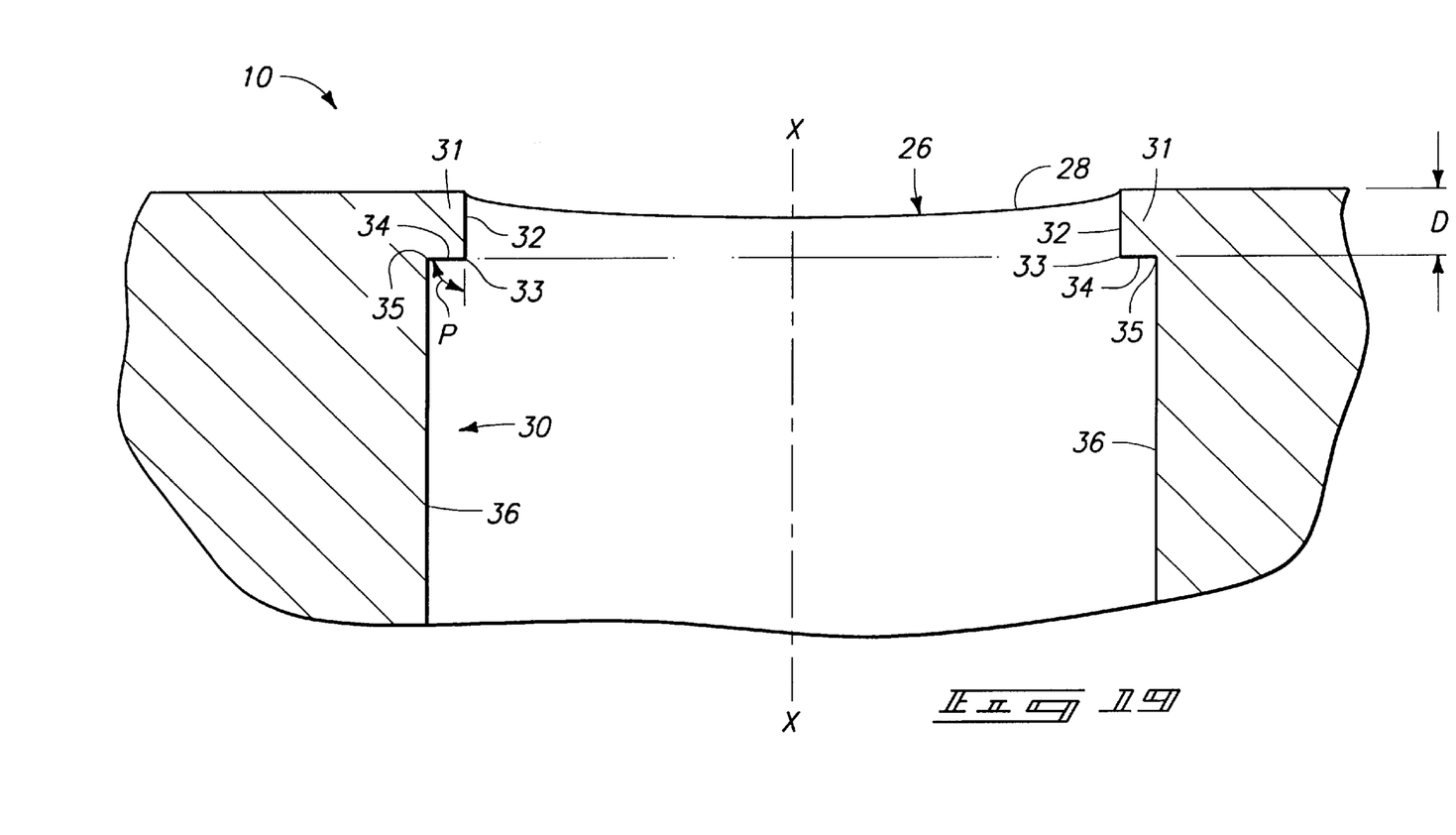
FIG. 19 is a sectional view similar to FIG. 18 only showing a different angle for a flared surface of the locking pin socket.

Looking in greater detail to the ball retainer socket 26, attention is drawn to FIGS. 18 and 19. Each socket 26 includes an external preferably circular opening 28 at an outward end of an internal socket wall 30. Each opening 28 includes a diameter less than the locking ball diameter.

The internal socket wall 30 includes a ball retainer flange 31 that is formed by a first outer socket wall section 32. Section 32 is preferably formed as a first cylindrical bore of the same diameter as the opening 28 and leads from the opening 28 to a first edge 33. The cylindrical section 32 is coaxial with the socket, formed about a central ball retainer axis X and includes an axial dimension (with respect to axis X) that is no greater than the radius of the associated locking ball. This dimension assures that a substantial amount of the tubular body material is disposed between the engaged surface of the ball and the socket opening, thereby significantly strengthening the flange 31 against any outward thrust from the ball.

The internal socket wall also includes a flared section 34 leading from the edge 33 to a second edge 35. The flared section 34 is preferably conical and coaxial with the axis X. FIG. 18 shows the flared section at an acute angle P to the axis X, while FIG. 19 shows the section 34 to be substantially perpendicular to the axis. The two different angles are within a range of operable angles that may be selected for the flared section. The preferred angular range is from approximately 10° to as much as 120°.

It is noted that an angle of 120° will result in an undercut that would require special tooling. However it is considered that such an angle would be attainable and would function to present the first edge 33 as a circular contact surface for the associated ball. The 90° angle shown in FIG. 19 would also produce a similar surface and could be easily produced using tooling similar to that described below.

The second edge 34 is situated at the juncture of the flared section 34 and a ball receiving section 36 that leads inward to the internal bore 16. The section 36 is also preferably cylindrical, but is formed on a diameter (centered on the axis X) that is greater than the locking ball diameter. Thus the ball will be free to move axially with respect to the axis X (radially with respect to axis A) between the operative and inoperative positions. When at the operative, outwardly projecting position, part of the ball will abut the ball retainer flange 31 and extend beyond the external tubular body surface as shown in FIG. 3. In the release or inoperative position (FIG. 2), the ball will be situated substantially inward of the external body surface.

Referring now to the actuator 40 in greater detail, attention is drawn to FIGS. 1–3. It is noted that the actuator is preferably formed from a solid one piece blank of material having high tensile strength, such as stainless steel. The actuator may be of one piece construction because of the configuration of the internal bore 16 of the tubular body. This is an advantage over prior art forms which require actuators to be formed of multiple interfitting pieces.

The present actuator preferably extends the full length of the tubular body 14 and projects slightly from the rearward end 22. The actuator 40 is also preferably of a cross-sectional configuration that is complementary to but smaller than the cross-sectional shape of the internal bore 16 to enable relative axial sliding motion.

In preferred forms, the reduced section 41 and the lock section 42 are integral with the actuator 40 and are separated by a filleted cam section 43. The fillet provides maximum tensile strength for the reduced section while functioning to engage and cam the balls outwardly when the actuator is moving rearwardly, and to guide the balls inwardly toward the reduced section when the actuator is moving forwardly.

The rearward end of the actuator 40 includes a button section 45 that is biased rearwardly by a spring 46 which acts against a shoulder 47 formed in the tubular body. The spring thus biases the actuator in such a manner that the lock section 42 is normally positioned as shown in FIGS. 1 and 3 to hold the balls 12 in the outward, operative locking positions. The button may be depressed against the spring tension to temporarily shift the actuator forwardly to bring the reduced section 41 into position (FIG. 2) so the balls may fall back to the inoperative position.

Reference will now be made in greater detail to the stop 52. In one preferred form (FIGS. 1–3) the stop 52 is comprised of a portion of the actuator and a complementary integral portion of the tubular body 14. Both portions are spaced from the lock ball sockets, so the balls will not be subjected to axial thrust from the actuator (produced by the spring 46). Thus, the balls are confined (in their outward locking positions) only by the lock section 42 of the actuator and the ball retainer sockets 26. This is an advantage over prior art ball lock pins where a headed end of an actuator is axially biased in point contact against locking balls substantially as shown in FIG. 4. The present structure will stand up well under extended use because the axial thrust is isolated from the balls, and because of the socket structure ball retainer flange construction described above.

The stop 52 in a first preferred form includes an abutment surface 53 that is formed as an integral part of the body 14. The surface 53 is preferably conical and centered on the axis A. The actuator 40 includes a stop flange 54 that is preferably complementary to the conical configuration of abutment surface 53. Thus, the surface 53 will center the actuator coaxially with the axis A, and the actuator lock section 42 will be centered with respect to the balls 12. The centered lock section 42 will thus maintain the balls 12 at equal radial spacing from the axis A, and both balls will project equal distances from the external body surface 18. This assures even wear on the exposed parts of the balls.

Reference will now be made to another preferred embodiment which is exemplified in FIGS. 6 and 7. This embodiment has numerous similarities to the embodiment described above. For example, the ball retainer sockets 26 are similarly formed and thus bear the same reference numerals. However, construction of the tubular body and actuator include features that provide numerous significant assembly advantages.

Figure 6:
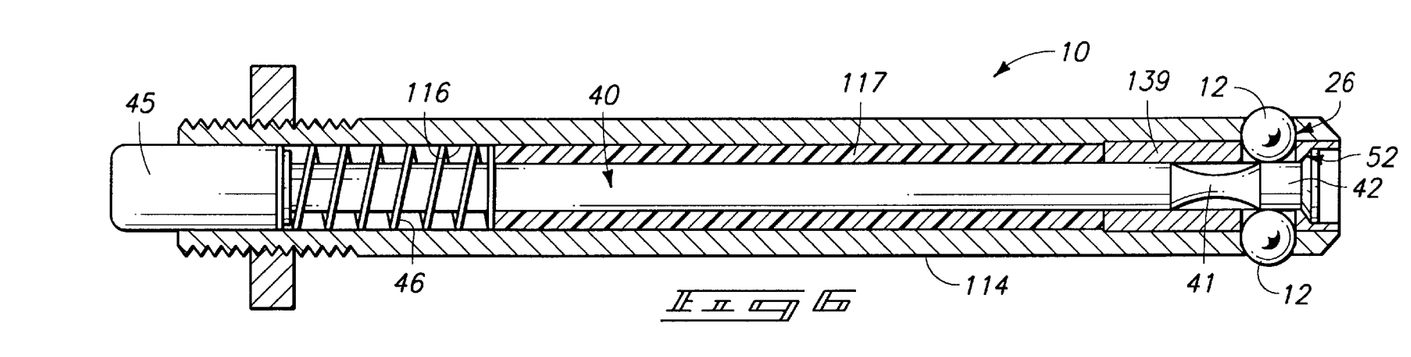
FIG. 6 is a cross-sectional view of a second preferred form of the present quick release ball type locking pin with the balls in outward projecting locking positions.
Figure 7:
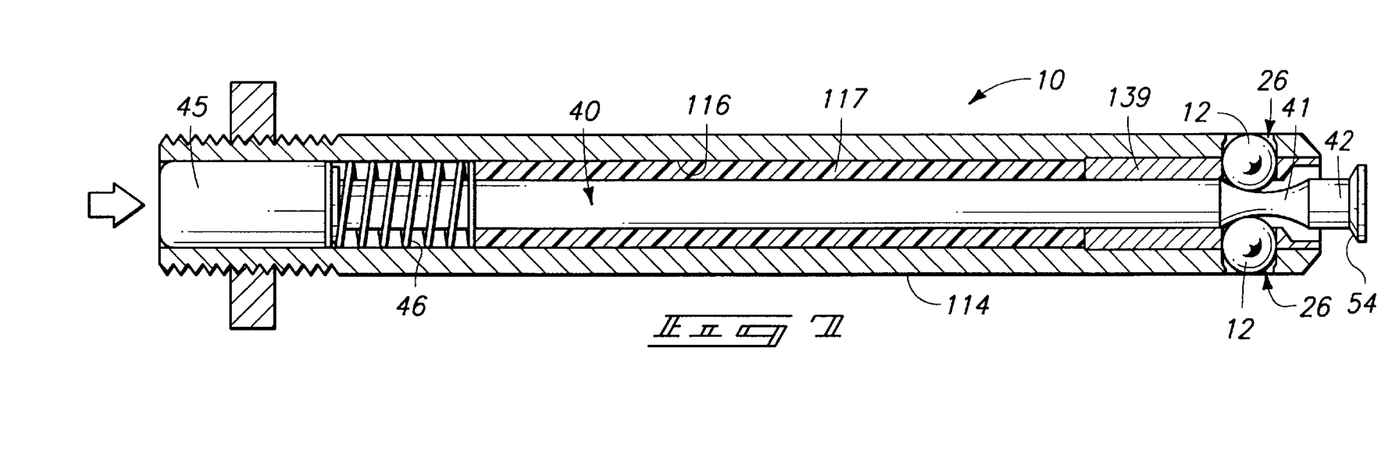
FIG. 7 is a view similar to FIG. 6 only showing the balls in inward unlocking or inoperative positions.

The tubular body 114 of the FIGS. 6 and 7 embodiment is formed of a simple tube of continuous cross-sectional configuration. Preferably the tube is of circular cross section. This enables the body to be formed without requiring boring or milling processes to form the internal bore 116. Thus the tubular body 114 may be selected from existing, commercially available tubing, of any desired length, and at an expense that is greatly reduced over tubular bodies that must be machine formed, cast or otherwise specially shaped.

In preferred applications, the tubular body 114 is formed of rolled stainless steel or another appropriate material, with a preferred wall thickness that is advantageously between approximately 5% and 25% of the tube diameter. This wall thickness to diameter relationship is available in conventional tubing and has been found to provide sufficient rigidity for the present ball type locking pins.

Since the tubular body 114 includes a smooth cylindrical internal bore 116, a sleeve insert 139 is formed and press fitted or otherwise secured within the bore of the tubular body 140 to form parts of the ball retainer sockets 26 and stop 52. The sleeve insert 139 can be produced in one length dimension, but can be used on tubular bodies 114 of any selected length.

The same or a similar actuator 40 can be used in the FIG. 6 and 7 embodiment, but is slidably received within a spacer collar 117 which, in turn is slidably received within the internal bore 116 of the tubular body 114. A forward end of the collar 117 will preferably abut the sleeve insert 139 and extend axially therefrom toward the rearward end of the tube. The spring 46 will abut the spacer collar 117 at one end and the button 45 at an opposite end. The button will be sized with an external diameter to be slidably received within the tubular bore 116, and extend to a finger access end projecting outwardly of the tubular body.

With the construction set forth above, a locking pin of nearly any selected length may be easily made up simply by cutting the tubular body 114 to the desired length from available tube stock, inserting the sleeve insert, cutting the spacer collar to an appropriate length (again from available tube stock), and providing an actuator of an appropriate length. To this end, the actuator may be provided in interconnected sections so the shank part between the button and the reduced section 41 could also be selected from readily available stock material. The button and forward end section could be threaded or otherwise secured to the selected shank length to complete the actuator.

Reference is now made to FIGS. 8–17 which show a preferred quick release ball type locking pin socket milling tool 200 which is uniquely configured to mill the ball retainer sockets 26. The preferred tool which may be formed of conventional carbide or high speed tool steel, includes a shank 202 and a cutter body 204 axially disposed in relation to the shank along a rotation axis R and leading from the shank 202 to a free end 206. A first cutting edge 208 on the cutter body 204 is formed at a first radius from the rotation axis R projecting outward of the shank 202. A first bevel cutting edge 210 leads angularly between the first cutting edge 208 and a reduced cutting portion 205 which, in turn leads to the shank 202. The same diameter reduced cutting edge 205 may also be provided at the free end 206. The reduced cutting edges 205 may be used for machining or removing burrs at the external openings 28.

Figure 8B:
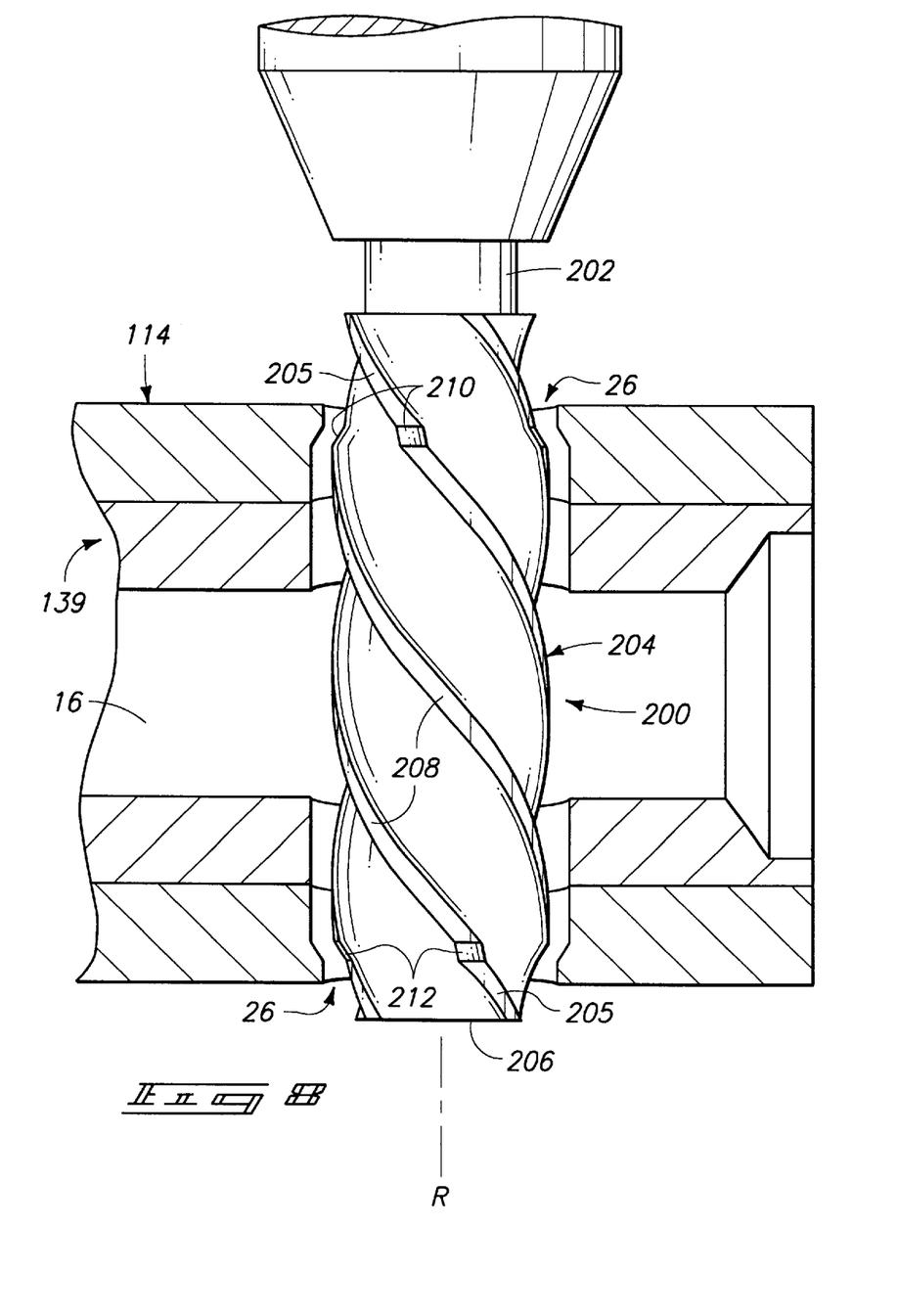
FIG. 8 is a sectional view showing operation of a novel quick release ball type locking pin socket milling tool.
Figure 9:
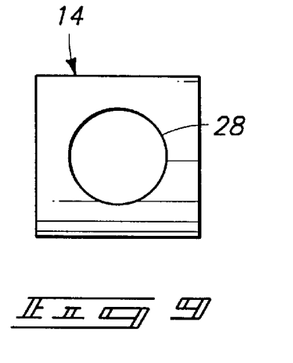
FIGS. 9–17 are progressive operational views illustrating formation of a ball locking pin socket.
Figure 10:
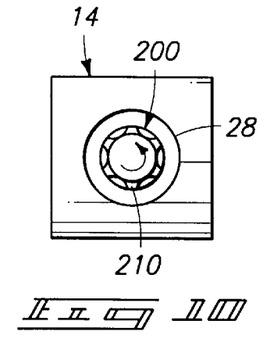
Figure 11:
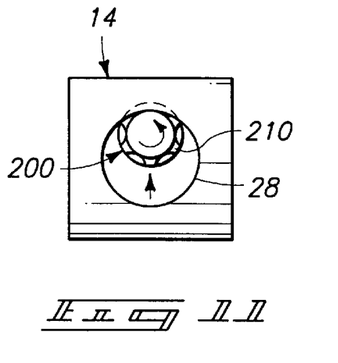
Figure 12:
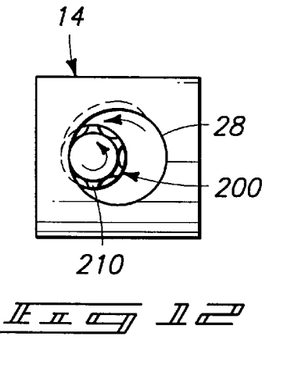
Figure 13:
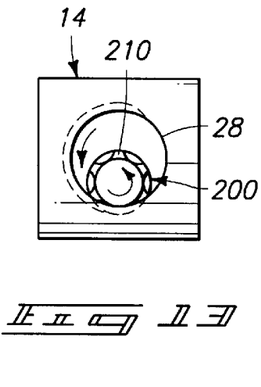
Figure 14:
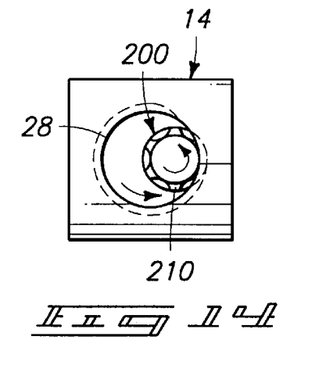
Figure 15:
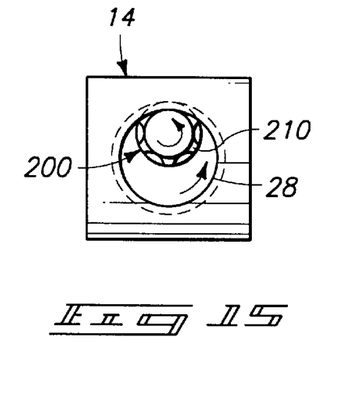
Figure 16:
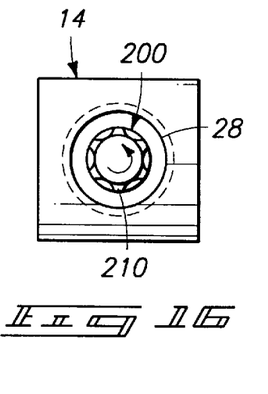
Figure 17:
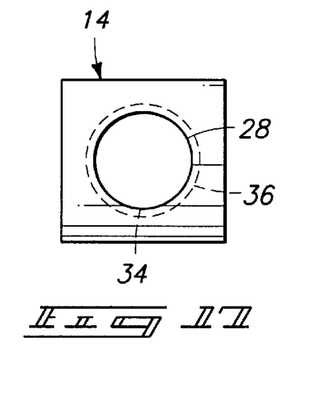

In preferred forms, a second bevel cutting edge 212 is also provided on the cutter body 204. The first cutting edge 208 is disposed axially between the first and second bevel cutting edges 210 and 212.

The present milling tool 200 can be used with conventional milling machinery to cut the described ball retainer sockets from within the tubular body 14 or 114. FIGS. 9–17 exemplify a sequence by which the cutting operation may be performed. First a pilot hole is bored through the tubular body 14 or 114 (including the sleeve insert 139), to roughly form the external opening 28 and the first outer socket wall sections 32. Now the tool is inserted into the pilot hole to a depth where the first and second bevel cutting edges 210 and 212 are positioned equally inward from the external body surface 18. The tool is rotated about the axis R, and moved in a rotary manner as suggested in FIGS. 11–15 about the circumference of the bored pilot hole. In doing so, the cutting edges will form the flared sections 34 and the ball receiving sections 36 from within the tubular body. The edges 205 may be used for final machining of the external opening and first outer socket wall sections 32.

The above described tool and process eliminates any need to coin the external body surface to form the ball retainer flange 31. The external body surface thus remains continuous and uninterrupted about the external opening 28. This is a distinct advantage over processes that require coining of the pin surface to form a stop flange as shown by the prior art configurations of FIGS. 4 and 5. More material is thus provided between the engaged parts of the balls and the external body surface 18, and significant additional strength and wear resistance is provided.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A quick release ball type locking pin, comprising:
   a tubular body formed along an axis and including a forward end and a rearward end;
   the tubular body including an internal bore defined by an internal tubular wall surface, and an external tubular body surface;
   a locking ball retainer socket formed in the tubular body at the forward end, the socket being substantially normal to the axis;
   a ball in the ball retainer socket and moveable therein between an outward operative position wherein part of the ball extends radially beyond the external tubular body surface, and a release position radially inward of the operative position;

an actuator within the internal bore and axially movable therein;

wherein the actuator includes a reduced section positionable in substantial radial alignment with the ball to allow movement of the ball to the release position, and a lock section also positionable in substantial radial alignment with the ball to lock the ball against movement from the operative position toward the release position; and a stop flange surface and an abutment surface on the actuator and tubular body, centered on the axis with one of which including a conical surface axially engaging the other surface to center the actuator on the axis with the lock section in substantial radial alignment with the ball.

2. A quick release ball type locking pin as defined by claim 1, wherein the lock section of the actuator is cylindrical.

3. A quick release ball type locking pin as defined by claim 1, wherein the actuator is formed as a single, one piece construction.

4. A quick release ball type locking pin as defined by claim 1, wherein the abutment surface is formed in the tubular body; and the stop flange is on the actuator positioned for engagement with the abutment surface.

5. A quick release ball type locking pin as defined by claim 1, wherein the abutment surface is in the tubular body between the ball retainer socket and the forward end of the tubular body; and the stop flange is on the actuator, positioned for engagement with the abutment surface.

6. A quick release ball type locking pin as defined by claim 1, wherein the conical surface is formed on the stop flange for engagement with the abutment surface.

7. A quick release ball type locking pin as defined by claim 1, wherein the conical surface is formed on the abutment surface.

8. A quick release ball type locking pin as defined by claim 1, wherein the abutment surface is formed in a tubular insert fitted within the tubular body.

9. A quick release ball type locking pin as defined by claim 1, wherein the internal bore of the tubular body is formed on a consistent diameter with respect to said axis;

wherein the abutment surface is formed in a tubular insert secured within the internal bore and slidably receiving a portion of the actuator.

10. A quick release ball type locking pin as defined by claim 1, wherein the stop flange surface and abutment surface both include conical surfaces shaped for axial resting engagement.

11. A quick release ball type locking pin as defined by claim 1, wherein the lock section of the actuator is cylindrical.

12. A quick release ball type locking pin, comprising:

a tubular body formed along an axis and including a forward end and a rearward end;

the tubular body including an internal bore defined by an internal tubular wall surface, and an external tubular body surface;

a locking ball having an outside ball diameter;

a locking ball retainer socket formed in the tubular body, and including an external opening along the external body surface and an internal socket wall leading from the external opening into the internal bore;

the internal socket wall including a ball retainer flange formed by a first outer wall section defining the external opening and including a cross-sectional dimension less than the outside ball diameter and leading inward with respect to the axis from the external opening to a first edge spaced inward of the external opening;

the internal socket wall also including a flared section leading from the first edge to a second edge;

a ball receiving section leading inward to the internal bore from the second edge;

wherein the ball is movably received in the locking ball retainer socket for movement therein between an outward operative position wherein part of the ball abuts the ball retainer flange and extends radially beyond the external tubular body surface, and a release position radially inward of the operative position; and an actuator within the internal bore and configured to selectively allow movement of the ball to the release position, and to lock the ball against movement from the operative position.

13. A quick release ball type locking pin as defined by claim 12, wherein the tubular body surface is continuous and uninterrupted about the external opening.

14. A quick release ball type locking pin as defined by claim 12, wherein the locking ball retainer flange is a milled surface.

15. A quick release ball type locking pin as defined by claim 12, wherein the first outer wall section, edge, and flared section are integral with the tubular body.

16. A quick release ball type locking pin as defined by claim 12, wherein the first outer wall section is circular and the flared section is conical and substantially coaxial with the first outer wall section.

17. A quick release ball type locking pin as defined by claim 12, wherein the first outer wall section is formed as a first cylindrical bore and the flared section is conical and substantially coaxial with the first cylindrical bore.

18. A quick release ball type locking pin as defined by claim 12, wherein:

the first outer wall section is formed as a first cylindrical bore leading from the external opening to the edge.

19. A quick release ball type locking pin as defined by claim 12, wherein:

the first outer wall section is formed as a first cylindrical bore leading from the external opening to the edge; and the flared section is conical and substantially coaxial with the first cylindrical bore.

20. A quick release ball type locking pin as defined by claim 12, wherein:

the first outer wall section is formed as a first cylindrical bore leading from the external opening to the edge;

the flared section is conical and substantially coaxial with the first cylindrical bore; and the ball receiving section is formed as a second cylindrical bore that is substantially coaxial with the first cylindrical bore.

21. A quick release ball type locking pin as defined by claim 12, wherein the locking ball retainer socket is formed about a ball retainer axis; and wherein the flared section is conical and substantially coaxial with the ball retainer socket axis at an angle between approximately 10° and 120° to the ball retainer axis.

22. A quick release ball type locking pin as defined by claim 12, wherein the locking ball retainer socket is formed about a ball retainer axis; and wherein the first outer wall section is formed as a first cylindrical bore about the ball retainer axis and includes an axial dimension that is no greater than the radius of the locking ball.

23. A quick release ball type locking pin as defined by claim 12, wherein the locking ball retainer socket is formed about a ball retainer axis; and wherein the first outer wall section is formed as a first cylindrical bore about the ball retainer axis and includes a diameter that is less than the outside ball diameter.

24. A quick release ball type locking pin as defined by claim 12 wherein the tubular body is formed of stainless steel.

25. A quick release ball type locking pin as defined by claim 12 wherein the tubular body includes an external diameter and wherein a wall thickness dimension between the internal tubular wall surface and the external wall surface is over approximately 5% of the external diameter.

26. A quick release ball type locking pin as defined by claim 12 wherein the tubular body is formed of stainless steel and further comprising an insert mounted within the tubular body and slidably mounting the actuator.

27. A quick release ball type locking pin as defined by claim 12 wherein the tubular body is a tube formed of rolled sheet stainless steel.

28. A quick release ball type locking pin, comprising:

a tubular body of a circular cross-sectional shape formed along an axis and including a forward end and a rearward end;

the tubular body including an internal bore defined by an internal tubular wall surface, and an external tubular body surface formed at a prescribed external tube diameter with respect to the axis;

a sleeve insert within the internal bore including an actuator receiving bore centered on the axis;

a locking ball;

a locking ball retainer socket formed in the tubular body and sleeve insert;

wherein the locking ball is received in the locking ball retainer socket for movement therein between an outward operative position wherein part of the ball extends radially beyond the external tubular body surface, and a release position radially inward of the operative position; and an actuator within the internal bore and configured to selectively allow movement of the ball to the release position, and to lock the ball against movement from the operative position.

29. A quick release ball type locking pin as defined by claim 29 wherein the actuator is comprised of:

an elongated actuator shaft slidably received within the internal bore and the actuator receiving bore of the sleeve insert;

a spacer collar slidably received within the internal bore and in abutment with the insert sleeve and extending axially therefrom;

a spring having one end engaging the spacer collar within the internal bore and extending axially therefrom to a button engaging end; and an actuator button mounted to the actuator shaft and slidably received within the internal bore, engaging the spring and extending therefrom to a finger access end projecting outwardly of the tubular body.

* * * * *